No. 897,978. PATENTED SEPT. 8, 1908.
C. G. HICKS.
CABLE SUSPENSION TRANSPORTATION SYSTEM.
APPLICATION FILED MAR. 12, 1907.
3 SHEETS—SHEET 1.
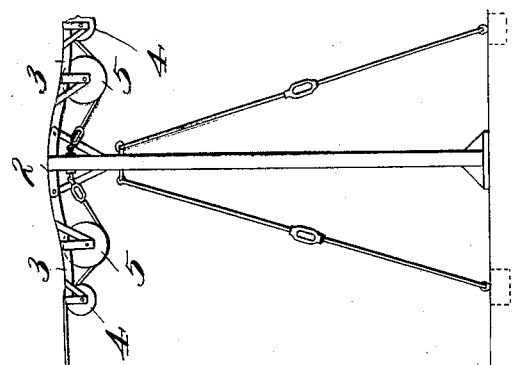
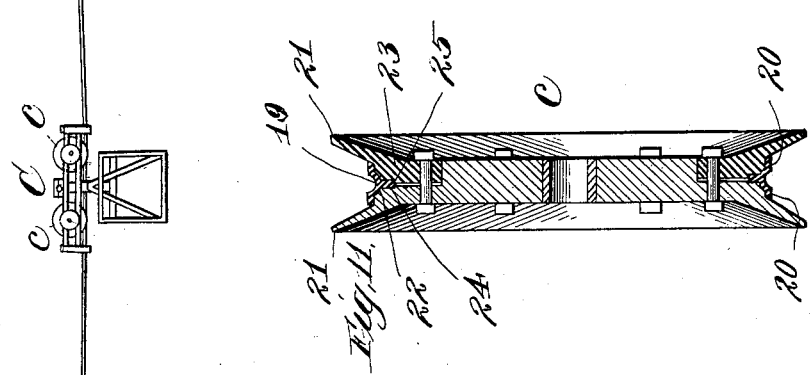
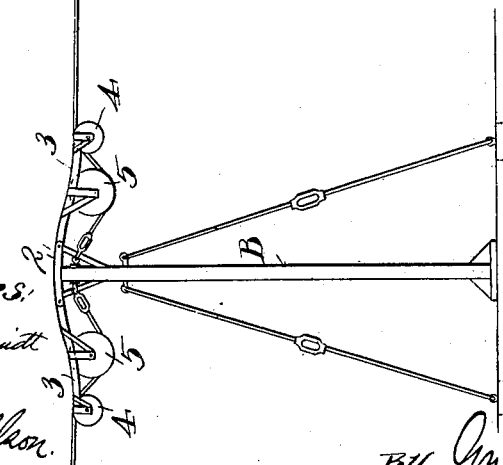
Witnesses,
Inventor,
Charles G. Hicks,
By
Atty

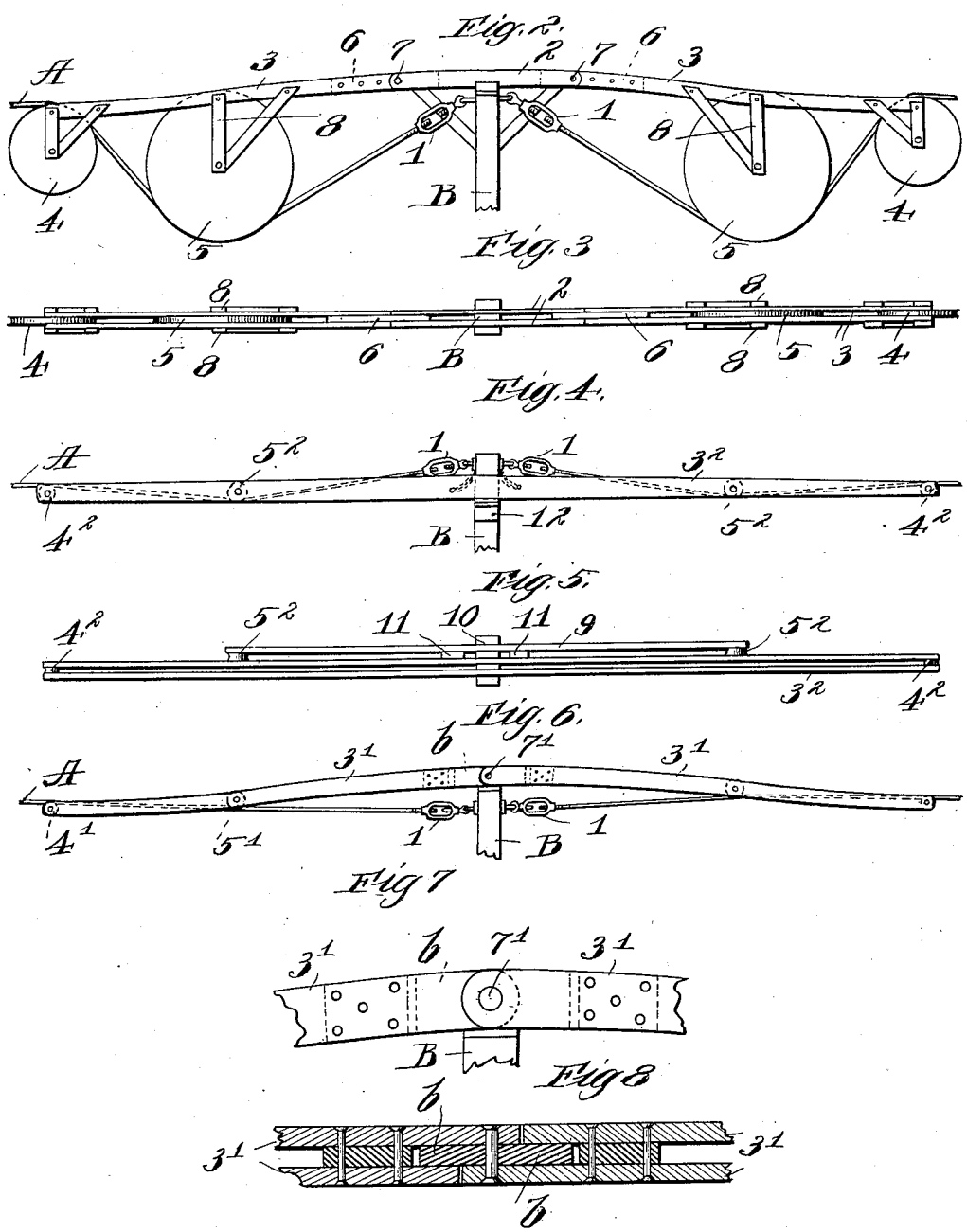

No. 897,978. PATENTED SEPT. 8, 1908.
C. G. HICKS.
CABLE SUSPENSION TRANSPORTATION SYSTEM.
APPLICATION FILED MAR. 12, 1907.
3 SHEETS—SHEET 3.
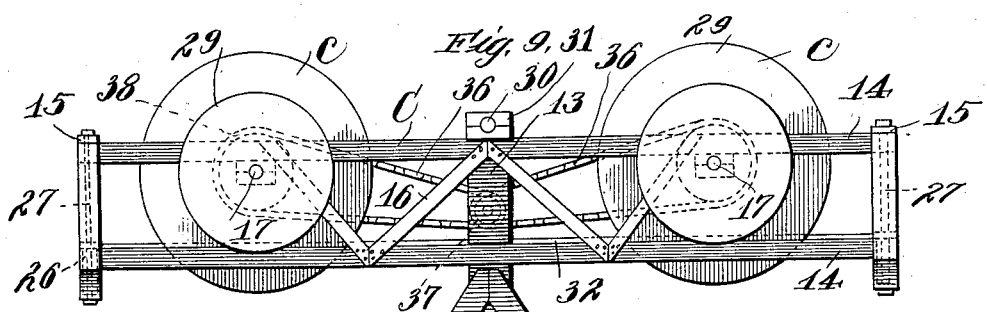
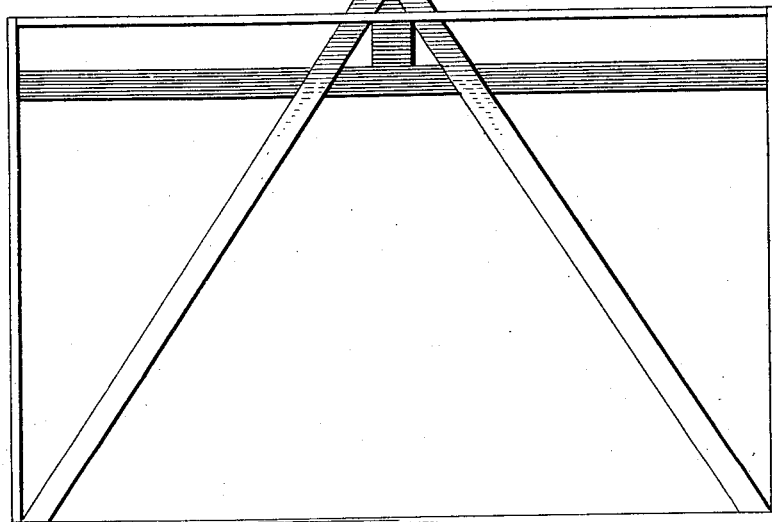
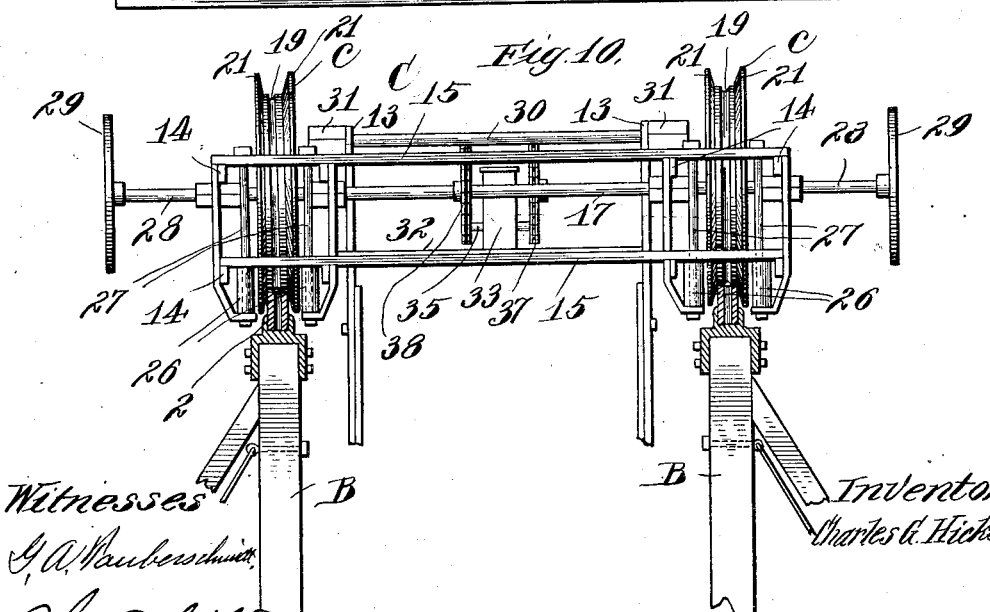

UNITED STATES PATENT OFFICE.

CHARLES G. HICKS, OF CHICAGO, ILLINOIS, ASSIGNOR OF ONE-HALF TO JOHN W. KILMORE, OF CHICAGO, ILLINOIS.

CABLE-SUSPENSION TRANSPORTATION SYSTEM.

No. 897,978.      Specification of Letters Patent.      Patented Sept. 8, 1908.

Application filed March 12, 1907. Serial No. 361,988.

*To all whom it may concern:*

Be it known that I, CHARLES G. HICKS, a subject of the King of Great Britain, and a resident of Chicago, Cook county, Illinois, have invented certain new and useful Improvements in Cable-Suspension Transportation Systems, of which the following is a specification.

This invention relates to cable suspension transportation systems.

Broadly stated, the object of my invention is to provide a transportation system of this type adapted for the transportation of both passengers and freight at a rate of speed, say from ten to twenty miles an hour, which will render the same practical and economical, both mechanically and commercially.

To this end my invention consists particularly in providing improved means for preventing sagging of the supporting cables under the weight of the cars as they approach the poles or other supports for the cables which, as is well known, unless prevented, forms an abrupt ascent over which it is often impossible for the cars to pass, particularly when operating under their own power, or if their momentum is sufficient to carry them over, will impart such a severe jar and jolt to the cars as to render them not only too uncomfortable for passenger service, but, also, very dangerous, owing to the liability of their being thrown off from the cables. So far as I am aware, prior to my invention, no means for this purpose had ever been devised which would overcome the described objection and render riding in the cars of a system of this type safe and comfortable and at the same time render it practicable to run the cars at a rate of speed necessary to economy of operation, commercially as well as mechanically.

My invention also comprises guides which engage the cables in advance of the car or truck wheels which are adapted to secure and insure proper engagement of said wheels with the cables, thus lessening the power required to propel the cars and reducing liability of derailment thereof to minimum, due to a sudden swerve in said cables.

My invention also comprises safety devices adapted to prevent the cars from falling in case of derailment.

My invention also consists of the various other features, combinations of features and details of construction hereinafter described and claimed.

In the accompanying drawings, in which my invention is fully illustrated,—Figure 1 is a side view of a section of a cable suspension transportation system of my invention. Figs. 2 and 3 are, respectively, enlarged side and plan views of the track sections connecting adjacent cable spans in Fig. 1. Figs. 4 and 5 are views similar to Figs. 2 and 3 of a modified form of track section. Fig. 6 is a side view of still another modified form of track section. Figs. 7 and 8 are, respectively, enlarged side and plan views showing the manner of pivoting the arms forming the track sections shown in Fig. 6 to the supporting poles. Fig. 9 is an enlarged side view of a car designed for use with my improved transportation system. Fig. 10 is an end view of the car truck, showing the same as passing over the track sections connecting adjacent spans; and Fig. 11 is an enlarged sectional view of one of the truck wheels.

Referring now to the drawings, A designates the cables forming the track, B the poles upon which said cables are supported and C a car supported upon the cables A by rollers *c*. In practice I prefer to use two supporting cables A which extend parallel with each other and are supported upon separate series of poles B arranged in pairs transversely of the structure.

An important feature of my improved transportation system consists in making the cables A in separate sections, the ends of each section being independently connected to adjacent poles, preferably in such manner as to provide for adjusting the tension thereof and for taking up the slack, as by means of turn-buckles 1. By this construction, the slack of the cable and its sag under the weight of the cars passing over the same, will be limited to that of each section, instead of to the slack of a number of sections, as is the case where the cables A extended continuously over a number of spans of the structure. The obvious result is that the sag of the cables, as the cars approach the poles, will be much less than with cables continuous over several spans.

To prevent sagging of the cables A adjacent to the poles B and to permit the car to pass over the poles B without jarring or jolting, the spans of the cables A on opposite sides of the poles are connected by track sections over which the cars pass from one span of the cable to another. In what I consider their preferable form, said track sections (see Figs. 1, 2 and 3) comprise sections 2 rigidly secured to the upper ends of said poles, to the opposite ends of which are pivoted arms 3, which are respectively connected to the cable spans A on opposite sides of the poles B, in such manner that the ends of said arms will be supported by said cable, while, at the same time, permitting said cable to play freely through the same. As preferably constructed, the means for connecting said arms to the cable spans consist of rollers 4 and 5 revolubly mounted in said arms 3, the rollers 4 at the ends of said arms and the rollers 5 at such a distance therefrom that the bend of the cable in passing around said wheels or rollers will not be sufficiently abrupt to interfere with its running freely upon said rollers. The rollers 4 and 5 are preferably grooved, thus forming guides for the cable. The cables A pass over the tops of the rollers 4, thence under the rollers 5, and are secured to the poles B, preferably at points as high as possible above the lower sides of the rollers 5. The track sections 2 and arms 3, thus form tracks over which the cars pass from one cable span to another, and the arms 3 are made of such length, say from twelve to fifteen feet, that the sag of the cable, due to the weight of the car, will produce a grade or inclination of the arms 3 such that the cars can easily ascend the same even when running under their own power. In ordinary cases the relation will be such that the grade or inclination of said arms will be from twelve to fifteen inches in the length of the arm, although the momentum of the cars, particularly when running at a reasonably high speed, will be sufficient to carry them up considerably higher.

In the preferable construction shown, the track sections 2 and arms 3 both consist of two metal bars, spaced and rigidly connected to form a structure of desired width and the arms 3 are pivoted to the tracks 2 by means of bars 6 rigidly secured between the inner ends of the bars forming the arms 3, the ends of said bars 6 projecting beyond the inner ends of the arms 3 and being provided with suitable holes or openings adapted to engage pivot pins 7 secured in the ends of the track sections 2. The ends of the track sections 2 are rounded concentric with the axis of said pivot pins 7 and the inner ends of the bars forming the arms 3 are reversely curved, correspondingly, so that the upper edges of said arms 3 will be tangent to the treads of the track sections 2, thus permitting the cars to pass from said arms 3 to said track sections 2 without jar or jolt.

In what I consider now to be the preferable embodiment of my invention, the guide wheels or rollers 5 are made of considerable size, say thirty inches in diameter, being revolubly mounted in suitable depending brackets 8 on the arms 3, the cables A passing around the same being secured to the poles B at points as high as possible above the lower sides of said wheels or rollers. With this construction, it is obvious that the weight and tension of the cable sections A will exert a force on the under sides of the wheels or rollers 5 tending to raise the outer end of the arm 3 normally considerably above the points of attachment of the cable sections to the poles B. As, however, a car approaches a pole, the weight of the car will operate to depress said arm and, by properly adjusting the tension of the cable sections, said cable sections and the arms 3 may be brought substantially into alinement, so that the cars will pass from said cable sections onto said arms practically without jolt or jar. Preferably, also, the wheels or rollers 4 are made of considerable size, say fifteen inches in diameter, thus bending the cables A on relatively large radii where they pass over the same and allowing said cables to play over said wheels with very slight resistance. My invention, however, contemplates equally the use of small wheels or rollers, and in Figs. 6, 7 and 8, I have shown such small wheels or rollers, the same being designated $4^1$ and $5^1$, respectively.

While I prefer to use the intermediate track sections 2 and to pivot the arms 3 thereto, as shown in Figs. 1, 2 and 3, and as heretofore described, my invention contemplates equally pivoting said arms directly to the poles B. This modification is illustrated in Figs. 6, 7 and 8 of the drawings, in which $3^1$ designates the arms pivoted directly to plates $b$ which extend upwardly from the tops of the poles B, between the bars or members forming said arms, the thickness of the plates $b$ being equal to the distance between the bars or members forming said arms. In order to pivot said arms $3^1$ to the plates $b$ without varying the thickness of the arms at their pivotal points, one member only of each arm $3^1$ is pivoted to the plate $b$, the pivoted members of different arms pivoted to the same pole being on opposite sides of said plate. As in the preferable construction, the ends of the pivoted members of the arms $3^1$ are rounded concentric with the pivot pins $7^1$ and the coöperating member of the opposite arm correspondingly rounded so that the upper surfaces of said arms will be practically continuous with each other at their pivotal point. In order to prevent the arms $3^1$ from becoming disengaged from the pivot pin $7^1$, the bearing plates $b$ are extended in both directions beyond the ends of the unattached members of said arms $3^1$.

In Figs. 4 and 5 of the drawings I have illustrated still another modification or embodiment of my invention. In this modification the track sections, designated by $3^2$, instead of being made up of a plurality of members, including members pivoted on both sides of the poles, extend continuously on both sides of the poles B. As shown, said track sections $3^2$ are substantially the same in construction as the arms 3 consisting of rigidly connected bars spaced to form track sections of desired width.

The track sections $3^2$ are provided with suitable guides which engage corresponding guide ways on the poles B and guide said track sections $3^2$ vertically relatively to said poles. As shown, said guides consist of bars 9 rigidly connected to the track sections $3^2$, which engage vertical slots 10 formed in the poles B, said bars 9 being spaced from the members of the track sections $3^2$ to which they are secured, a sufficient distance to provide necessary clearance between said track sections and the poles. Suitable stops 11 on the track sections $3^2$ maintain the same in desired longitudinal position relatively to the poles B. Mounted in the opposite ends of the track sections $3^2$, are rollers $4^2$ over which the cable sections A pass, as in the forms of pivoted track sections previously described. From the wheels or rollers $4^2$ the cable sections A pass under wheels or rollers $5^2$ preferably mounted between the guide bars 9 and the members of the track sections $3^2$ to which said bars 9 are connected, thus bringing the attached ends of the cables substantially in line with the poles B. Preferably, also, said cable sections A will be attached to the poles B above said track sections $3^2$.

If desired, suitable means may be provided for the purpose of defining their lowermost positions on the poles B, as for instance, brackets 12. Ordinarily, however, I prefer to dispense with such supports.

As regards its general features, the cars C may be of any approved or desired construction. For purposes of illustration, I have shown the same merely as a rectangular box-shaped structure open at the top suspended from a truck supported on the cables A by means of arms 13.

The car truck comprises a suitable frame consisting, as shown, of longitudinal frame members 14 connected by transverse frame members 15, reinforced, if desired, by diagonal bracing 16.

Revolubly mounted in suitable bearings on the truck are shafts 17 secured to rotate with which are the wheels $c$. The wheels $c$ are of peculiar construction, being provided with peripheral grooves 19 adapted to engage the cables A and at both sides of said grooves 19 with flat treads 20 adapted to run upon the treads of the different forms of track sections 3, $3^1$ and $3^2$, heretofore described. In order that said truck wheels $c$ may pass from the cables to the track sections 3, $3^1$ and $3^2$, and vice versa, without jar or jolt, the wheels or rollers 4, $4^1$ and $4^2$ mounted in the ends of the track sections, are so positioned that the top sides of the cables will extend above the treads of the track sections a distance equal to the depth of the grooves 19 in said truck wheels.

To prevent derailment of the trucks, the truck wheels $c$ are preferably provided with flanges 21 which embrace opposite sides of the cables A and of the track sections 3, $3^1$ and $3^2$.

In order to increase the traction of the truck wheels $c$ and to reduce the wear on the cables from the action of said truck wheels, I prefer to provide said truck wheels with tires 22 of vulcanized fiber, rubber, leather or the like.

To provide for adjusting the tires 22 to the wheels $c$, said wheels are preferably provided with removable sections 23, at their peripheries, the grooves 19 being formed partly in said removable sections 23 and partly in the solid portions of the wheels $c$.

When the wheels are constructed with removable tread sections 23, a relatively narrow groove 24 is preferably formed at the bottoms of the grooves 19, partly in said removable sections 23 and partly in the solid sections of the wheels and formed at the interior of the removable tires 22 are inwardly projecting flanges 25, which are normally slightly wider than the width of the grooves 24. Thus, when the removable sections 23 of the wheels are secured in position the tongues or flanges 25 will be securely clamped in said grooves 24, thus preventing said tires 22 from slipping on the wheels and also providing for quickly and conveniently removing and replacing the same when desired. Where said tires 22 are made of vulcanized rubber, they can be cast directly upon the wheels.

As a further improvement in transportation systems of this type, I provide suitable guides on the trucks located at a considerable distance, say two feet, in advance of the points of engagement of the truck wheels $c$, with the cables A, which embrace said cables, thus operating to maintain the cables in alinement with the grooves 19 in said wheels $c$, thereby reducing the danger of derailment, due to sudden swerves in the cables and also reducing the resistance to the movement of the car caused by friction between said cables and the flanges 21 of said wheels. As shown, said guides consist of rollers 26 revolubly mounted on vertically disposed studs or pins 27 secured in the transverse frame members 15, the longitudinal frame members 14 being extended so as to bring the frame members 15 and thus the guide rollers 26 in desired position in advance of the truck wheels $c$.

In order to prevent the car from falling, in case of derailment, the shafts 17 are extended a considerable distance on both sides of the truck, as shown at 28, and secured to the outer ends thereof are plates or disks 29. In case of derailment, the cables A will catch either upon the truck frames or upon the extensions 28 of the shafts 17, the disks 29 preventing said cables from sliding off from said shaft extensions 28, in case said shaft extensions rest upon said cables.

As shown, the car C is suspended from a shaft 30 revolubly mounted in suitable bearings 31 on the longitudinal frame members 14 of the truck frame.

The cars C may be propelled in any desired or approved manner, either by means of suitable connection with an outside source of power or by means of suitable motors carried by said cars and driving connection between said motors and the truck shafts 17. I prefer, however, to operate said cars under their own power, which, to save room in the cars and to afford a good outlook to the engineers or motormen, will preferably be mounted on the trucks, and in Figs. 9 and 10 of the drawings I have illustrated this arrangement, 32 designating a suitable platform supported on the longitudinal frame members 14 of the truck frame between the wheels c. Mounted on the platform 32 is a motor indicated at 33, preferably an approved form of gasolene motor. The platform 32 is sufficiently large to safely and conveniently carry the motorman or engineer and, if desired, may be protected by a suitable railing.

The motor shaft, indicated at 35, is operatively connected with the truck axles 17 by means of chain belts 36 adjusted to sprocket wheels 37 and 38 secured respectively to said motor shaft and to the truck axles. To insure against break downs, I prefer to use two chain belts, one connected to each axle, but I contemplate equally the use of a single chain belt.

I claim:—

1. A cable suspension transportation system comprising cables, supports therefor, track sections connecting adjacent cable spans at said supports said track sections comprising movably supported members and means for engaging said movably supported members of said track sections with said cable spans comprising supporting guides mounted in the ends of said movably supported members of said track sections and inner supporting guides, the cables passing over said outer and under said inner supporting guides.

2. A cable suspension transportation system comprising cables, supports therefor, track sections connecting adjacent cable spans at the supports said track sections comprising movably supported members and means for engaging said movably supported members of said track sections with said cable spans comprising supporting guide wheels mounted at the ends of said movably supported members of said track sections and inner guide wheels, the cables passing over said outer and under said inner guide wheels.

3. A cable suspension transportation system comprising cables, supports for said cables, track sections connecting adjacent cable spans at said supports, said track sections comprising connected bars spaced apart to form a track of desired width, and comprising also movably supported members, and means for engaging said movably supported members of said track sections with the cables at opposite sides of said supports, comprising supporting guides secured between the outer ends of said spaced members forming said track sections and inner supporting guides, the cables passing over said outer guides and under said inner guides.

4. A cable suspension transportation system comprising cables, supports for said cables, track sections connecting adjacent cable spans at said supports, said track sections comprising connected bars spaced apart to form a track of desired width, and comprising also movably supported members, and means for engaging said movably supported members of said track sections with the cables at opposite sides of said supports, comprising guide wheels mounted between the ends of the spaced members of said track sections and inner guide wheels also mounted between the members of said track sections, the cables passing over said outer and under said inner guide wheels.

5. A cable suspension transportation system comprising supports, cables supported thereby, each span of which forms a separate section and track sections connecting adjacent cable spans at said supports, said track sections comprising movably supported members and means for engaging said movably supported members of said track sections with said cable spans comprising supporting guides mounted in the ends of said movably supported members of said track sections and inner supporting guides, the cable spans passing over said outer and under said inner supporting guides.

6. A cable suspension transportation system comprising supports, cables supported thereby, each span of which forms a separate section, track sections connecting adjacent cable spans at said supports, said track sections comprising movably supported members and means for engaging said movably supported members of said track sections with said cable spans comprising guide wheels revolubly mounted at the ends of said movably supported members of said track sections and inner guide wheels, said cables passing over said outer and under said inner guide wheels.

7. A cable suspension transportation system, comprising supports, cables supported thereby, each span of which forms a separate section, track sections connecting adjacent cable spans at said supports said track sections comprising movably supported members and means for engaging said movably supported members of said track sections with said cable spans comprising a supporting guide mounted at the ends of said movably supported members of said track sections and inner guide wheels of considerable size, the cables passing over said outer supporting guides and under said inner guide wheels and being connected to the supports above the lower sides of said inner guide wheels.

8. A cable suspension transportation system comprising cables, supports therefor, track sections connecting adjacent cable spans at said supports, said track sections comprising arms pivoted to said cable supports and means for engaging said arms with said cable spans comprising supporting guides mounted in the ends of said arms and inner supporting guides, the cables passing over said outer and under said inner supporting guides.

9. A cable suspension transportation system comprising cables, supports therefor, track sections connecting adjacent spans at said supports, said track sections comprising arms comprising connected bars spaced apart to form tracks of desired width, said arms being pivoted to the cable supports at one end and means for engaging said arms with said cables comprising supporting guides mounted at the ends of said track sections between the members thereof and inner supporting guides, the guides passing over said outer and under said inner supporting guides.

10. A cable suspension transportation system comprising supports, cables supported thereby, each span of which forms a separate section, track sections connecting adjacent cable spans at said supports, said track sections comprising arms pivoted to said supports at one end, supporting guides mounted at the ends of said arms and inner supporting guides, the cables passing over said outer and under said inner supporting guides.

11. A cable suspension transportation system comprising cables, supports therefor, track sections connecting adjacent cable spans at said supports, said track sections comprising intermediate portions rigidly supported upon said cable supports and arms pivoted to said fixed portions, and means for engaging said arms with said cables comprising supporting guides mounted in the ends of said arms and inner supporting guides, the cables passing over said outer and under said inner guides.

12. A cable suspension transportation system, comprising supports, cables supported thereby, each span of which forms a separate section, track sections connecting adjacent cable spans at said supports, said track sections comprising intermediate portions mounted in fixed position on said cable supports and arms pivoted to said fixed portions at one end and comprising connected bars spaced apart to form a track of desired width, and means for engaging said arms with said cables, said means comprising guide wheels mounted at the ends of said arms between the spaced members thereof and inner supporting wheels likewise mounted between the spaced members of said arms, the cables passing over said outer and under said inner supporting wheels.

13. A cable suspension transportation system comprising cables, supports therefor, track sections connecting adjacent cable spans at said supports, which are relatively wide as compared with the diameter of the cable, a car, wheels thereon which engage said cables, said wheels being provided with peripheral grooves adapted to engage the cables and with flat tread portions outside of said grooves adapted to engage the treads of said track sections.

14. A cable suspension transportation system comprising cables, supports therefor, track sections connecting adjacent cable spans at said supports, said track sections comprising movably supported members comprising connected bars spaced apart to form a track of desired width, means for engaging said movably supported members of said track sections with the cable at opposite sides of said supports, comprising supporting guides secured between the outer ends of said spaced bars forming said movably supported members of said track sections and inner supporting guides, the cables passing over said outer and under said inner guides, a car, supporting wheels thereon adapted to run upon said cables, said supporting wheels being provided with peripheral grooves adapted to engage said cables and with flat tread portions adapted to run upon the track sections connecting adjacent cable spans, the outer supporting guides for engaging said track sections with said cables being positioned so as to bring the tops of the cables above the treads of the track sections a distance equal to the depth of the peripheral grooves in the car wheels.

15. A cable suspension transportation system comprising cables, supports therefor, cars, wheels thereon adapted to run upon said cables and safety devices to prevent said cars from falling in case of derailment, comprising lateral projections on said cars and downward extensions thereof outside of the supporting cables.

16. A cable suspension transportation system comprising cables, supports therefor, a car, axles revolubly mounted therein, wheels secured to said axles, lateral extensions of said axles and disks secured to said extensions outside of the supporting cables.

17. A cable suspension transportation system comprising cables, supports therefor, a car truck, axles revolubly mounted therein, wheels secured to said trucks and adapted to run upon the supporting cables, a car suspended from said truck, a motor mounted upon said truck, and driving connection between said motor and an axle of the truck.

18. A cable suspension transportation system, comprising cables, supports therefor, cars, wheels therein adapted to run upon said cables and guides on said cars which embrace the cables in advance of said car wheels.

19. A cable suspension transportation system, comprising cables, supports therefor, cars, wheels therein adapted to run upon said cables and guides on said cars which embrace the cables in advance of said car wheels consisting of elongated rollers revolubly mounted on vertically disposed studs secured in the car frame.

In testimony, that I claim the foregoing as my invention, I affix my signature in presence of two subscribing witnesses, this 6th day of March, A. D. 1907.

CHARLES G. HICKS.

Witnesses:
JOHN W. KILMORE,
GEORGE L. CHINDAHL.